Figure 1:
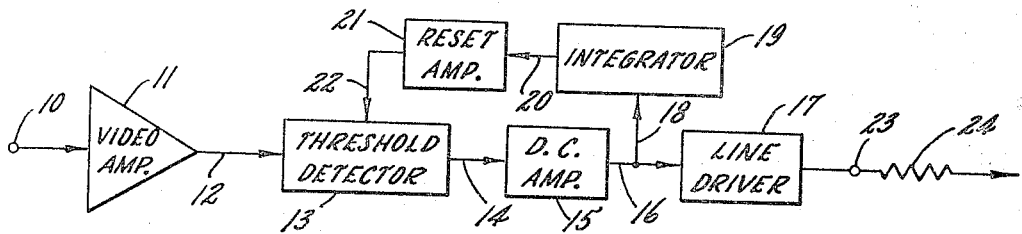

May 23, 1967

R. A. LINDER ETAL
VIDEO THRESHOLD DETECTOR UTILIZING A TUNNEL
DIODE AS A SWITCHING ELEMENT
Filed Feb. 5, 1964

3,321,576

INVENTORS.
RICHARD A. LINDER
BY JERRY E. STEELE

H. H. Loselle
ATT'YS.

United States Patent Office 3,321,576
Patented May 23, 1967

3,321,576
VIDEO THRESHOLD DETECTOR UTILIZING A TUNNEL DIODE AS A SWITCHING ELEMENT
Richard A. Linder and Jerry E. Steele, Baltimore, Md., assignors, by mesne assignments, to the United States of America as represented by the Secretary of the Navy
Filed Feb. 5, 1964, Ser. No. 342,837
10 Claims. (Cl. 178—7.3)

This invention relates to threshold detector circuits and more particularly to transistor video threshold detector circuits including a tunnel diode detector to produce substantially square wave synthetic signals rapidly from narrow pulse video signals exceeding a predetermined threshold.

With the coming of higher speed aircraft the necessity for speeding up radar systems for detecting the high speed aircraft becomes essential and particularly in the speed-up of the data processing circuits of radar receivers. One means of speeding up radar receiver systems as well as a means of increasing the accuracy of radar receiver systems have been in the means of encoding radar analog voltage target signals into voltage signals capable of use in digital data processing circuits. At present radar systems have been increased in speed of operation to the point where they are operating in a microsecond ($1\times10^{-6}$ second) speed range but still more speed of operation of the circuitry is desired to data process target information in the nanosecond ($1\times10^{-9}$ second) speed range. It is very desirable at this point of our radar techniques to increase the data processing speeds in the nanosecond range which has become a possibility with newer semiconductor crystal devices having extremely rapid response characteristics.

In the present invention a video threshold detector is devised which will, in the matter of nanoseconds, produce synthetic voltage signals of a substantially constant amplitude and bandwidth for driving digital equipment from the detection of low power or low amplitude analog voltage signals of targets illuminated by the radar. This invention combines the use of a single stage wide band transistor video amplifier coupled to receive target analog voltage signals detected on the output of the amplifier by a tunnel diode network. This tunnel diode is biased in a bistable low voltage condition and is very rapidly responsive to any target signals exceeding a predetermined threshold to switch to its high voltage state and remain there until it is reset to its low voltage state. The tunnel diode rapidly switches a two-stage direct current (D.C.) transistor amplifier in common emitter configuration, the first stage of which is normally in the "off" or "nonconducting" state and the second stage of which is normally in the conductive saturation state. The D.C. amplifier has an output coupled to a single stage driver circuit and also through an integrating network to a reset transistor amplifier, the output of the latter of which is coupled in feedback to the tunnel diode to reset the tunnel diode to its low voltage state. Because of the general shape of the tunnel diode characteristic curve, much less energy is required to switch the tunnel diode from its low voltage state to its high voltage state than from its high voltage state back to its low voltage state. The line driver transistor is an emitter follower capable of driving a hundred ohm coaxial line with four volt pulses. It is therefore a general object of this invention to provide a video threshold detector circuit utilizing transistor amplifiers and a tunnel diode in a combination to develop synthetic substantially square wave output voltage pulses of predetermined amplitude and bandwidth for each detected input pulse of variable amplitude exceeding a predetermined threshold.

Figure 2:
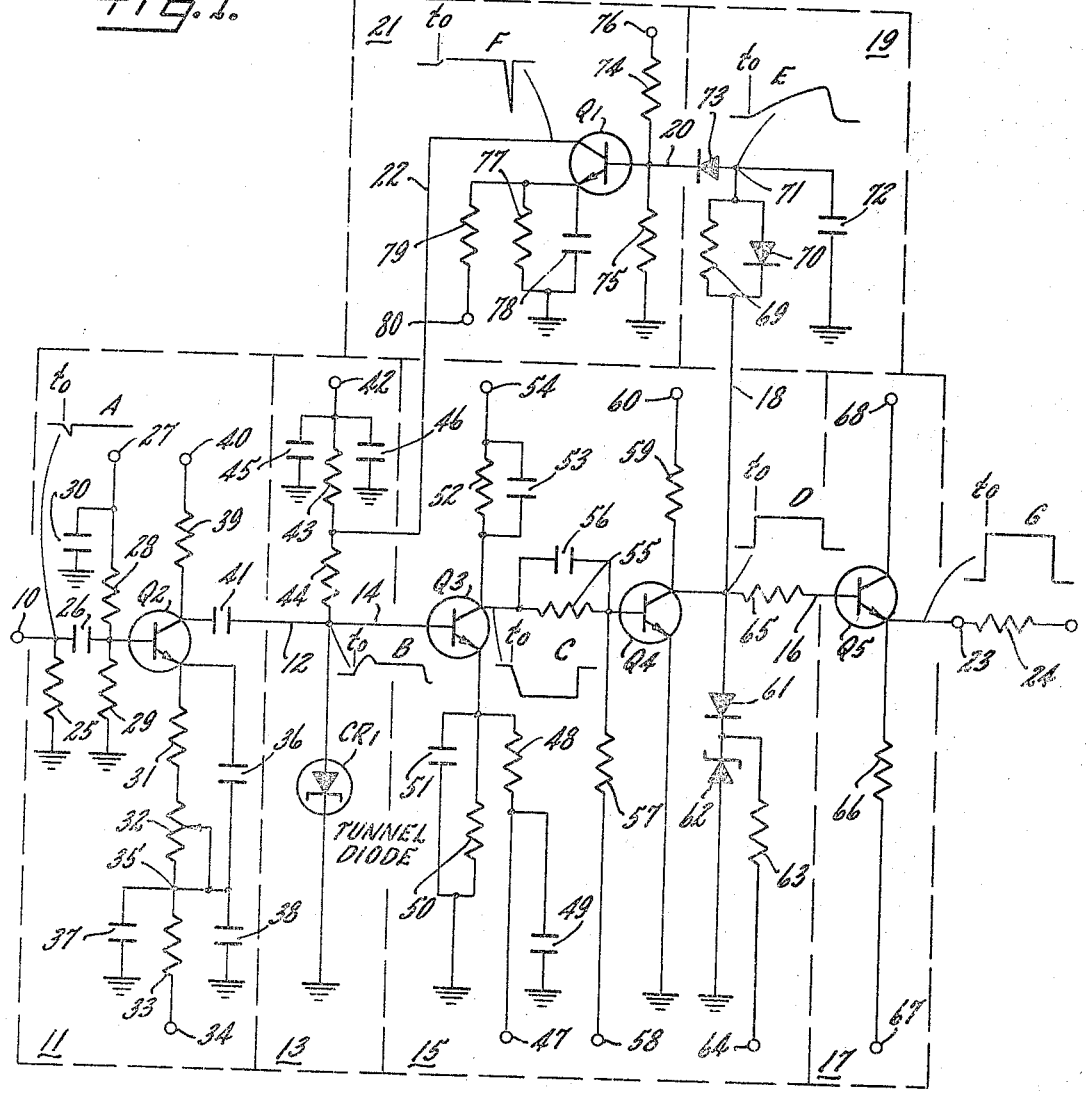

These and other objects and the attendant advantages, features, and uses will become more apparent to those skilled in the art when considered along with the preferred embodiment of this invention illustrated in the accompanying drawing, in which;

FIGURE 1 illustrates in block circuit diagram the combination of elements and components essential to the invention, and FIGURE 2 is a circuit schematic diagram of FIGURE 1.

Referring more particularly to FIGURE 1, video signals applied from the radar receiver circuit are adapted to be coupled to terminal 10 and applied to a video amplifier 11 the output of which is by way of conductor means 12 to a threshold detector 13. The output of the threshold detector 13 is by way of the conductor means 14 to a D.C. amplifier 15. The D.C. amplifier output is by way of conductor means 16 to a line driver circuit 17 and by way of a branch conductor 18, through an integrator 19, and over a conductor 20 to a reset amplifier 21. The output of the reset amplifier 21 by way of an output conductor 22 back to the threshold detector 13 completes a loop of the threshold detector, the D.C. amplifier, the integrator, and the reset amplifier in feedback relation to reset the threshold detector from its high voltage state produced by a detected target pulse back to its low voltage state. Line driver 17 has an output over the conductor means 23 to a line such as a hundred ohm coaxial line represented by the resistance means 24 illustrated in this figure.

For a more complete illustration of the circuit used in FIGURE 1, reference is made to FIGURE 2 wherein like reference characters are used for like parts illustrated in FIGURE 1. The input 10 to the video amplifier 11 is applied across a resistor 25 of about 50 ohms. This establishes a threshold level equal to about −15 decibels below one milliwatt (dbm) across a 50 ohm load. The input signal from terminal 10 is capacitor coupled through the capacitor 26 to the base of a transistor Q2, this base being biased from a negative voltage source at terminal 27 through resistors 28 and 29 to a neutral voltage source such as ground. The base of transistor Q2 is coupled to the juncture of resistors 28 and 29 and the negative voltage source 27 is coupled to one plate of a capacitor 30, the opposite plate of which is coupled to ground. The emitter of transistor Q2 is coupled through a resistor 31, a potentiometer 32, and a second resistor 33 to a negative voltage source applied at terminal 34. The adjustable tap of the potentiometer 32 is coupled to the juncture 35 of the potentiometer 32 and resistor 33. Terminal 35 is likewise capacitor coupled through a capacitor 36 to the emitter of transistor Q2 and also to the upper plates of capacitors 37 and 38, the opposite plates of which are coupled to the neutral or ground potential. The collector of transistor Q2 is coupled through a resistor 39 to a terminal 40 supplying a positive collector voltage to transistor Q2. The series parallel combination of resistor 31, potentiometer resistance 32, and capacitor 36 provide emitter degeneration to give the wide bandwidth to the video amplifier circuit coupled to the transistor Q2. The adjustable tap of the potentiometer 32 provides a gain adjustment of ±2.5 decibels (db) to compensate for any manufacturing tolerances in the resistors, capacitors, transistors, and tunnel diode so that the threshold detector may be set to an exact sensitivity of −15 dbm ±.1 db.

The collector output of transistor Q2 in the video amplifier 11 is capacitor coupled through a capacitor 41 over the output conductor 12 to the anode of a tunnel diode CR1, the cathode of which is coupled to the neutral or ground. The tunnel diode has the anode thereof biased from a positive voltage source applied at terminal 42 through resistors 43 and 44 in series, the terminal 42 likewise being coupled to one plate of each of two capacitors 45 and 46 having the opposite plates coupled to ground. The two resistors 43 and 44 are precision resistors to minimize variations in the triggering level of the tunnel diode. It is known that tunnel diodes can be easily biased for bistable operation because of its negative resistance characteristics. Tunnel diode CR1 is biased to near its peak current, low voltage point which holds the tunnel diodes in its low voltage state. Any pulse amplitude by the video amplifier 11, which exceeds the threshold established by the tunnel diode, immediately switches the tunnel diode CR1 to its high voltage state. It has been found that tunnel diodes switch from the low voltage state to the high voltage state with tremendous speed, so fast, in fact, that it cannot be measured with even the fastest oscilloscope but is calculated to be as low as a few pico seconds, where one pico second is equal to $1 \times 10^{-12}$ seconds.

The output of the tunnel diode detector 13 is by way of conductor means 14 to the base of the first transistor stage Q3 of the two-stage transistor D.C. amplifier 15. The emitter of transistor Q3 is coupled to a terminal 47 from a negative voltage source through a resistor 48, the terminal 47 likewise being coupled to one plate of a capacitor 49 having the opposite plate coupled to ground. The emitter of transistor Q3 is likewise coupled through a parallel RC circuit having a resistance 50 and capacitor 51 coupled to ground. The collector of transistor Q3 is coupled through a parallel circuit including a resistor 52 and a capacitor 53 to a terminal 54 supplied with a positive voltage potential. The resistors 48 and 50 provide a forward bias on the transistor Q3 which bias is insufficient to start conduction of this transistor but allows the tunnel diode CR1 to make this transistor conduct to saturation when it switches from its low voltage state to its high voltage state. The collector output of transistor Q3 is coupled through a parallel circuit consisting of a resistor 55 and a capacitor 56 to the base of the second stage transistor Q4 of the D.C. amplifier. The base of transistor Q4 is likewise coupled through a resistor 57 to a terminal 58 supplying a negative voltage thereto. The emitter of transistor Q4 is coupled directly to ground while the collector thereof is coupled through a resistor 59 to a terminal 60 being supplied positive voltage. The resistors 57 and 59 normally bias the transistor Q4 into saturation. The parallel couplings 55 and 56 from the collector of transistor Q3 to the base of transistor Q4 provides a high speed coupling from the first stage of the D.C. amplifier to the second stage to allow the second stage amplifier Q4 to be driven to cut-off with a minimum storage time and fast rise time. The collector of transistor Q4 is coupled in series through a diode 61 and a Zener diode 62 to ground, the cathodes of the diodes 61 and 62 being coupled in back-to-back relation, this juncture being coupled through a resistor 63 to a terminal 64 to which is applied a positive voltage. The diodes 61 and 62 limit the collector output of transistor Q4, the Zener diode 62 in conjunction with the voltage source 64 and resistor 63 establishing a voltage level for limited output signals on the collector of transistor Q4.

The output of the D.C. amplifier 15 is resistor coupled by the resistor 65 over the output conductor 16 to the base of a transistor Q5 in the line driver circuit 17. The transistor Q5 has its emitter coupled through a resistor 66 to a terminal 67 to which is applied a negative voltage. The collector of transistor Q5 is directly coupled to a terminal 68 to which is applied positive voltage, the output being taken from the emitter providing an emitter follower driver circuit 17.

The output of the D.C. amplifier 15 is also coupled by way of a branch conductor 18 to the integrator network 19 by way of a parallel network consisting of a resistor 69 and a diode 70 to terminal 71. Terminal 71 is coupled to one plate of a capacitor 72, the opposite plate of which is coupled to ground. The resistor 69 and capacitor 72 provide the integrating function of signals supplied over the branch conductor 18 from the D.C. amplifier to the reset amplifier 21. The diode 70 is oriented with its anode coupled to the terminal 71 and its cathode coupled to the branch conductor 18 to provide a short recovery time of the integrated signals in the order of .3 microseconds. Terminal 71 is coupled through a diode 73 to the base of the reset transistor amplifier Q1 over the output conductor 20 of the integrator network 19.

The base of the reset transistor amplifier Q1 is biased from a divider circuit consisting of resistors 74 and 75 coupled between a negative voltage source applied at terminal 76 and ground. The emitter of transistor Q1 is coupled to ground through a parallel network consisting of a resistor 77 and a capacitor 78 and likewise coupled through a resistor 79 to a negative voltage source applied at terminal 80. The collector of transistor Q1 is coupled through the output conductor 22 to the juncture of resistors 43 and 44 in the threshold detector circuit 13 to apply reset voltages to the tunnel diode CR1. The feedback from the output of the D.C. amplifier 15 through the integrator 19 and reset amplifier 21 to the threshold detector constitutes a loop having one stable state; that is, one circuit cannot change state without changing the states of the other circuits and finally returning the loop to its one stable state. In this respect the loop acts like a monostable multivibrator.

The line driver circuit 17 including the transistor Q5 operating as an emitter follower has the transistor emitter thereof coupled to the output terminal 23 which output terminal may be coupled to a 100 ohm coaxial line represented by the resistor 24 to a digital computer data processing circuit for processing target information by digital means, as is well understood by those skilled in the digital data processing art.

*Operation*

In the operation of the video threshold detector, let it be assumed that the input signal is applied to terminal 10 as shown by the waveform A at a time $t_0$. The video amplifier 11 will amplify the input signal A on the output 12 to produce a broadband signal as shown by the waveform B. The tunnel diode having been biased at the near peak current state will be switched very rapidly to its high voltage state which immediately switches transistor Q3 in the D.C. amplifier 15 to its conductive condition and transistor Q4 to its nonconductive condition. The output of transistor Q3 will produce a negative voltage waveform as shown by the waveform C having sharp leading and trailing edges which waveform is readily applied to the base of transistor Q4 to produce the substantially square wave D illustrated on the output conductor 16. The waveform D will be integrated in the integrating network 19, the trailing edge of the integrated waveform E, as illustrated, being effective on the reset amplifier 21 and output 22 to produce the resetting pulse F on the tunnel diode CR1 to reset it to its low voltage state. Switching of the tunnel diode CR1 to its low voltage state causes rapid switching by the D.C. amplifier stages 15 to produce the substantially square wave D which is operative through the driver circuit 17 to produce waveform G at the output 23. The potentiometer 32 may be adjusted to adjust the gain of the video amplifier of ±2.5 decibels to compensate for any changes in circuit constants or manufacturing tolerances of the components or elements used in the combination circuit.

While the above description and disclosure may be used to produce a practical and operative device for producing synthetic voltage waveforms G from input voltage pulses A in a time interval not exceeding several nanoseconds, an operative example will be given hereinbelow with the results attainable from the values of the various elements used in the combination.

Resistors (in ohms)

| | |
|---|---|
| 25—50 | 55—560 |
| 28—3.9K | 57—68K |
| 29—10K | 59—470 |
| 31—33 | 63—220 |
| 32—100 | 65—100 |
| 33—2.7K | 66—680 |
| 39—6.8K | 69—3.3K |
| 43—4.64K | 74—100K |
| 44—11.0K | 75—10K |
| 48—1.78K | 77—100 |
| 50—100 | 79—3.3K |
| 52—5.6K | |

Capacitors ($\mu f.$ = microfarads)

| | |
|---|---|
| 26—.01 $\mu f.$ | 46—.1 $\mu f.$ |
| 30—1 $\mu f.$ | 49—1 $\mu f.$ |
| 36—47 $\mu\mu f.$ | 51—1 $\mu f.$ |
| 37—.01 $\mu f.$ | 53—68 $\mu\mu f.$ |
| 38—1 $\mu f.$ | 56—470 $\mu\mu f.$ |
| 41—.1 $\mu f.$ | 72—.0022 $\mu f.$ |
| 45—1 $\mu f.$ | 78—1 $\mu f.$ |

Transistors

| | |
|---|---|
| Q1—2N744 | Q4—2N744 |
| Q2—2N744 | Q5—2N708 |
| Q3—2N744 | |

Tunnel diode

CR1—1N2939A

Diodes

| | |
|---|---|
| 61—1N3064 | 70—1N277 |
| 62—1N746A | 73—1N3064 |

Voltages

| | |
|---|---|
| 27——28 | 60—+8 |
| 34——28 | 64—+8 |
| 40—+8 | 67——8 |
| 42—+8 | 68—+8 |
| 47——8 | 76——8 |
| 54—+8 | 80——8 |
| 58——8 | |

The video threshold detector constructed in the manner with the values as shown in the above example will produce a threshold sensitivity of +.1 db above −15 dbm and will have a threshold level variation under environmental conditions of not more than ±1.3 db. In one test of the video threshold detector the input bandwidth before threshold was 120 megacycles which produced a synthetic pulse width of 2.1 microseconds with an output recovery time of .3 microsecond. The synthetic pulse rise time had a maximum of 13 nanoseconds and the synthetic pulse time jitter from .5 db to +8 db above threshold was equal to 20 nanoseconds. The video threshold detector is self sufficient in that it can be triggered with pulses from 20 to 100 nanoseconds wide and needs no external reset for its operation. As may be seen from the above description and example, synthetic pulses of substantially square wave and not exceeding four volts is produced from weak input pulses such as A in the matter of a few nanoseconds speeding up the data processing operation so essential to present radar target detection. As may be seen in FIGURE 2, the waveforms B, C, D, E, F, and G show examples of the expected voltages which resulted from the sample of values given.

While many modifications and changes may be made in the constructional details and features of this invention to obtain the results acquired by the illustration and example given, it is to be understood that we desire to be limited in the spirit of our invention only by the scope of the appended claims.

We claim:

1. A video threshold detector circuit comprising: a video amplifier, a threshold detector, and a direct current amplifier in series coupled relation from a video input to a video output, said threshold detector being a tunnel diode biased in a bistable low voltage condition to trigger to a high voltage state from a low voltage video trigger pulse; and
an integrator and amplifier coupled in series from the output of said direct current amplifier to said tunnel diode to reset said tunnel diode to its bistable low voltage state ready for the next video trigger pulse whereby any minute video signals exceeding a predetermined voltage threshold will produce a synthetic video pulse on an output thereof of predetermined amplitude and bandwidth.

2. A video threshold detector circuit comprising:
a wideband video amplifier having an input to receive video signals and amplify same into wide bandwidths on an output thereof;
a tunnel diode coupled to the output of said video amplifier and biased in the bistable low voltage condition;
a direct current amplifier having an input coupled to the output of said video amplifier to amplify said detected wide band video signals on an output thereof;
an integrating network and a feedback amplifier coupled in series from the output of said direct current amplifier to said tunnel diode to produce an amplified reset pulse at the trailing edge of each video wide band pulse to reset said tunnel diode to its biased low voltage condition; and
a drive circuit coupled to the output of said direct current amplifier to amplify the video pulses on an output thereof whereby video signals exceeding a predetermined threshold will be synthetically reproduced in pulses of fast rise and fall time.

3. A video threshold detector circuit as set forth in claim 2 wherein
said direct current amplifier is a circuit including a transistor with the base thereof constituting said input thereto.

4. A video threshold detector circuit as set forth in claim 2 wherein
said direct current amplifier includes a pair of transistors coupled in common emitter configuration, the first transistor of which is base connected to the video amplifier output and the second transistor of which is collector connected to said output, the collectors of said pair of transistors being coupled to a collector load potential.

5. A video threshold detector as set forth in claim 4 wherein
said video amplifier, said feedback amplifier, and said drive circuit each include a transistor with the input for each applied to the base circuit thereof and the output of the video amplifier and the feedback amplifier from the collector thereof and the output of the drive circuit from the emitter, the emitter of the transistor in said video amplifier having an adjustable bias thereon to provide gain adjustment for said video amplifier.

6. A video threshold detector circuit comprising:
a transistor video amplifier having a base input to receive video signals, a collector output, and an emitter coupled to an adjustable biasing network and a resistor-capacitor circuit to adjust amplifier gain and to produce wide band video signals on said collector output;
a tunnel diode detector coupled to said video amplifier output and biased to a low voltage state;
a high speed direct current transistor amplifier coupled to the video amplifier collector output, said amplifier being turned off and on by the low and high voltage states of said tunnel diode detector, respectively;
an integrating network and a reset amplifier in series feedback from the output of said direct current amplifier to said tunnel diode to produce a reset pulse at the trailing edge of each wide band video pulse to reset said tunnel diode to its low voltage state; and a driver circuit coupled to the output of said direct current amplifier to produce amplified driving video signal pulses with exceedingly fast rise and fall times.

7. A video threshold detector circuit as set forth in claim 6 wherein said high speed direct current transistor amplifier includes two collector-to-base coupled transistors through a parallel resistor-capacitor coupling network, the first transistor of which has the base coupled to said video amplifier output and the emitter and base biased to hold said first transistor cut off but with a slight forward bias, and the second transistor of which has the collector thereof constituting the output of said direct current amplifier and the base and emitter biased to condition said second transistor for normal saturation conduction whereby the change of said tunnel diode from its low voltage state to its high voltage state will switch said first transistor to a saturation state and said second transistor to a cut-off state.

8. A video threshold detector circuit as set forth in claim 7 wherein said tunnel diode detector has its anode coupled to the output of said video amplifier and to a direct current biasing source through resistance means and its cathode coupled to a neutral potential, said bias being sufficient to hold said tunnel diode in its low voltage bistable state and capable of being triggered to its high voltage state by video input signals exceeding a predetermined threshold.

9. A video threshold detector circuit as set forth in claim 8 wherein said output of said direct current amplifier has a limiting network coupled thereto to limit the positive voltage swings to produce a flat top on said video signals.

10. A video threshold detector circuit as set forth in claim 9 wherein said reset amplifier output coupling to said tunnel diode is through said resistance means of said direct current biasing source to apply said reset pulses to said tunnel diode anode.

References Cited by the Examiner
UNITED STATES PATENTS 3,122,608  2/1964  Taylor _____ 178—7.3

References Cited by the Applicant
UNITED STATES PATENTS 2,594,769  4/1952  E. B. Hales.
3,002,154  9/1961  W. D. Schmitz et al.

JOHN W. CALDWELL, *Acting Primary Examiner.*

R. L. RICHARDSON, *Assistant Examiner.*